US007381664B2

(12) United States Patent
Shalaby

(10) Patent No.: US 7,381,664 B2
(45) Date of Patent: Jun. 3, 2008

(54) SURFACE ELECTROCONDUCTIVE BIOSTABLE POLYMERIC ARTICLES

(75) Inventor: Shalaby W Shalaby, Anderson, SC (US)

(73) Assignee: Poly-Med Inc., Anderson, SC (US)

( * ) Notice: Subject to any disclaimer, the term of this patent is extended or adjusted under 35 U.S.C. 154(b) by 133 days.

(21) Appl. No.: 11/378,178

(22) Filed: Mar. 17, 2006

(65) Prior Publication Data

US 2006/0208231 A1 Sep. 21, 2006

Related U.S. Application Data

(60) Provisional application No. 60/662,908, filed on Mar. 17, 2005.

(51) Int. Cl.

| | |
|---|---|
| ***B32B 27/04*** | (2006.01) |
| ***B32B 27/02*** | (2006.01) |
| ***B32B 5/18*** | (2006.01) |
| ***B32B 15/14*** | (2006.01) |
| ***D04H 1/00*** | (2006.01) |
| ***D02G 3/00*** | (2006.01) |

(52) U.S. Cl. ...................... 442/110; 442/164; 442/170; 442/226; 442/231; 442/317; 442/333; 442/340; 428/364; 428/365

(58) Field of Classification Search ................ 442/110, 442/164, 170, 226, 231, 317, 333, 340

See application file for complete search history.

(56) References Cited

U.S. PATENT DOCUMENTS

| | | | | |
|---|---|---|---|---|
| 5,336,698 | A * | 8/1994 | Kashiwagi et al. | 523/113 |
| 5,491,198 | A | 2/1996 | Shalaby et al. | |
| 5,558,517 | A | 9/1996 | Shalaby et al. | |
| 5,591,062 | A | 1/1997 | Hettinger | |
| 5,849,415 | A | 12/1998 | Shalaby et al. | |
| 6,117,554 | A * | 9/2000 | Shalaby et al. | 428/420 |

* cited by examiner

*Primary Examiner*—Lynda Salvatore
(74) *Attorney, Agent, or Firm*—Leigh P Gregory

(57) ABSTRACT

Organic inherently conductive polymers, such as those based on polyaniline, polypyrrole and polythiophene, are formed in situ onto polymeric surfaces that are chemically activated to bond, ionically, the conductive polymers to the substrates. The polymeric substrate is preferably a preshaped or preformed thermoplastic film, fabric, tube, or a medical device for tissue repair regeneration and/or replacement, although other forms of thermoplastic and thermoset polymers can be used as the substrates for pretreatment using, most preferably, C-succinylation-based processes followed by exposure to an oxidatively polymerizable compound capable of forming an electrically conductive polymer. The resultant conductive surface imparts unique properties to the substrates and allows their use in antistatic clothing, surface conducting films for electronic components and the like, and electromagnetic interference shielding for civilian and military installations as well as implantable medical devices.

10 Claims, No Drawings

SURFACE ELECTROCONDUCTIVE BIOSTABLE POLYMERIC ARTICLES

The present application claims the benefit of prior provisional application U.S. Ser. No. 60/662,908, filed Mar. 17, 2005.

FIELD OF THE INVENTION

This invention deals with surface electroconductive biostable polymeric articles made by directed polymerization of monomeric precursors of conducting polymer onto preformed articles, including those used in medical applications, which have been surface pre-functionalized with anionogenic groups under highly controlled conditions that do not compromise the physical integrity of the article surface or its bulk properties. In general, the present invention relates to articles whose surfaces are made conductive by the in situ formation of inherently conductive polymers (ICP) such as polyaniline, polypyrrole, and polythiophene, in the presence of chemically activated polymeric substrates carrying ionizable dicarboxylic acid groups. The latter are the hydrolysis products of succinic anhydride groups covalently bonded to the constituent polymeric chain about the surface, which have been produced by C-succinylation. This invention also deals with biostable preformed thermoplastic and thermoset polymeric articles capable of displaying modulated levels of surface conductivity, barrier properties to microwave and similar radiation, changing conductivity in the presence of oxidizing by-products of contacting biologic environments, and exhibiting no adverse effect to viable cells such as fibroblasts.

BACKGROUND OF THE INVENTION

Conventionally, materials are classified as metals, semiconductors, or insulators according to their ability to conduct electricity. In a material, electrons are organized in discrete energy levels or bands separated by a distinct amount of energy. According to band theory, if the highest filled band is only partly full, the empty states will assist conduction. The energy required to promote an electron from one energy band to the next higher band is called the band gap energy. Its magnitude determines whether such a material is a metal, semiconductor, or insulator. The energy level at the midpoint between the two bands is termed the Fermi level.

In metals the partially filled upper band is referred to as the conduction band. Addition of small amounts of energy excites electrons in this level quite easily. These easily excited electrons are responsible for the electrically conducting nature of metals. For a semiconductor, the valence band is completely filled, and the conduction band is completely empty. Therefore, exciting an electron requires the addition of energy equal to that of the band gap energy, approximately 1 eV at room temperature. Similarly, insulators have a completely filled valence band and a completely empty conduction band. However, the band gap energy required to move an electron into the unfilled conduction band is much greater than that of a semiconductor, on the order of 15 eV. Insulators, therefore, do not conduct electricity except under the application of rather large voltages.

Although most polymers are insulators, a class of inherently conductive polymers (ICPs) exists that cannot be classified in any of the above categories. Through oxidation and reduction reactions, ICPs are doped to electrically conductive states. The radical cations and radical anions formed in these reactions are accompanied by a distortion or relaxation of the polymer lattice, which acts to minimize the local strain energy. The energy level associated with these distortions is split from the continuum of band states and symmetrically positioned about the Fermi level.

ICPs can be divided into two groups, those possessing degenerate ground states and those without degenerate ground states. ICPs with degenerate ground states, e.g., polyacetylenes, do not have a determined sense of bond alternation. In these materials, the transposition of single and double bonds yields energetically equivalent structures. Most ICPs, such as poly(p-phenylene), are non-degenerate. In these materials, the transposition of single and double bonds leads to the formation of quinoid structures of significantly higher energy than the parent aromatic forms.

The level of conductivity achieved in ICPs depends on the molecular structure of the polymer backbone, the degree of doping, and the nature of the counter ion species incorporated. Conductive polymers display an impressive range of electrical conductivity produced by controlled doping. The considerably larger conductivity range in ICPs compared to semiconductor crystals results from the intrinsic difference in their structures. Because of their rigid, three-dimensional lattice structure, inorganic semiconductors can only accept dopant ions at low concentrations and therefore have a limited conductivity range. ICPs, on the other hand, consist of an assembly of pseudo-one-dimensional conjugate chains. They are able to accept far more dopant ions, thereby achieving a greater range of conductivity.

Pyrrole is polymerized by an oxidative process. Polypyrrole can be prepared either chemically through solution processing or electrochemically through polymer deposition on an electrode. Both processes involve electron transfer. The polymerization proceeds via the radical cation of the monomer which reacts with a second radical cation to give a dimer by elimination of two protons. Dimers and higher oligomers are also oxidized and react further with the radical cations to build up the polypyrrole chain. The polymer is thus formed by eliminating two hydrogens from each pyrrole unit and linking the pyrroles together via the carbons from which the hydrogens were eliminated.

Pyrrole is readily polymerized by a wide variety of oxidizing agents in aqueous solution. Polypyrrole can also be prepared electrochemically. Typically, polypyrrole films are galvanostatically deposited on a platinum electrode surface using a one-compartment cell containing an aqueous solution of pyrrole and an oxidizing agent.

Although polypyrrole is prepared in its oxidized conducting state, the resulting polymer can be subsequently reduced to give the neutral, highly insulating form. Electrochemical switching between the conducting and insulating state is accompanied by a color change from blue-black to yellow-green and a conductivity change which spans about ten orders of magnitude. As with polyaniline, switching between conducting and insulating states is a reversible process.

Conductive polymers have traditionally been plagued by problems of stability, narrowly defined here as the maintenance of conductivity. In the process of oxidative doping, ICPs are stripped of a fraction of their electrons, thereby increasing their conductivity by several orders of magnitude. While the gaps left by the lost electrons provide a pathway for charge to be conducted down the polymer chain, they also make the polymer highly reactive with oxygen and water. Stabilization, then, becomes an effort to minimize doping site loss by chemical degradation or doping site quenching by such contaminants as oxygen or water. Various methods have proven effective in stabilizing ICPs; among these are encapsulation techniques and the use of barrier resins and sacrificial layers.

Compared to other conjugated polymers, polyaniline and polypyrrole have an unusually good chemical stability and encounter only a minimal loss of conductivity upon exposure to ambient environments. For example, it has been found that the conductivity of emeraldine hydrochloride formed by the protonation of emeraldine base did not change during extended periods in laboratory air. Similarly, the electrical properties of polypyrrole are indefinitely stable in air at room temperature.

Because ICPs form rigid, tightly packed chains, they are generally resistant to processing, a problem which has limited their widespread commercial use. While tight chain packing is essential for interchain charge hopping, it also prevents the polymer from intermixing with solvent molecules. Therefore, as a whole, ICPs tend to form as intractable masses. Many approaches to synthesizing tractable ICPs have been explored including substituted derivatives, copolymers, polyblends, colloidal dispersions, coated latexes, and ICP composites. These efforts have yielded a rich variety of blends, random copolymers, and graft and block copolymers with enhanced processability.

For many years, researchers have strived to prepare smooth, coherent films of polyaniline and polypyrrole. In 1968, cohesive polypyrrole films were electrochemically prepared at an electrode surface. The electrochemical preparation of freestanding polyaniline films with a fairly smooth, featureless topography was accomplished in the early eighties. Unfortunately, ICPs formed by electrochemical polymerization are generally insoluble and brittle.

In an effort to produce conductive polymer films with improved mechanical properties, researchers have attempted to synthesize ICPs on polymeric supports. Because such supports are normally electrical insulators, the standard electrochemical methods of deposition are difficult to apply. Most research, therefore, has centered on the chemical polymerization of ICPs on suitable substrates.

For example, polypyrrole films have been formed on the surface of a polyvinyl alcohol-ferric chloride (PVA-$FeCl_3$) complex. An aqueous solution containing a mixture of polyvinyl alcohol and ferric chloride was deposited on a polyester support and allowed to evaporate. The PVA-$FeCl_3$ was then suspended over a solution of pyrrole in ethanol. Under these conditions, polymerization of pyrrole occurred on the PVA-$FeCl_3$ surface to produce a highly conducting, flexible laminate.

Also, pyrrole has been electrochemically polymerized onto an electrode covered with vinylidene fluoride-trifluoroethylene copolymer (P(VDF-TrFE)). Electrochemical polymerization of pyrrole was carried out in a one-compartment cell containing an electrode covered with the copolymer. Polypyrrole was incorporated into the P(VDF-TrFE) film by beginning at the electrode surface and continuing through to the film surface. This process resulted in very flexible and stretchable conducting films.

A method has been devised to coat textiles with a uniform layer of electrically conducting polymer via an absorption process. Polyaniline and polypyrrole are solution-polymerized onto nylon and polyethylene terephthalate fabrics. Examination of the fabrics indicates that each individual fiber is encased with a smooth, coherent layer of the ICP.

Similarly, a method has been developed for making an electrically conductive textile material which is a textile material made predominantly of fibers selected from polyester, polyaniline, acrylic, polybenzimidazole, glass and ceramic fibers, wherein the textile material is covered to a uniform thickness of from about 0.05 to about 2 microns through chemical oxidation in an aqueous solution with a coherent, ordered film of an electrically conductive, organic polymer selected from a pyrrole polymer and an aniline polymer. Examination of such materials indicates that each individual fiber is encased or enveloped with a smooth, coherent layer of the ICP.

Ultra-thin films of emeraldine hydrochloride have been formed on poly(methyl methacrylate) (PMMA) and polystyrene (PS) substrates. The laminate films are formed by the oxidative polymerization of aniline at the interface between a lower oxidizing aqueous solution and an immiscible solution of the polymer and aniline monomer in chloroform. Volatilization of the chloroform yields a free-standing laminate film of the desired polymer substrate coated on one side with a continuous layer of emeraldine hydrochloride. These laminate films possess the mechanical properties of the substrate and exhibit conductivities in the region of 10 S/cm.

ICPs have been polymerized in the pores of microporous support membranes, yielding thin, conductive films on the membrane surface. In one process, a microporous membrane is used to separate solution of a heterocyclic monomer from a solution of a chemical oxidizing agent. As the monomer and oxidizing agent diffuse toward each other through the pores in the membrane, they react to yield conducting polymers. The result is an ultrathin film, electrically conducting composite polymer membrane.

An interfacial polymerization method has been developed in which the pores of a microporous support membrane are filled with an oxidative polymerization reagent. The membrane-confined solution is exposed to a vapor phase containing a monomer which can be oxidatively polymerized to yield a conductive polymer. A thin, defect-free film of the conductive polymer grows across the surface of the microporous support membrane.

Recently, strong and highly conductive films up to 0.6 mm thick have been formed from polyaniline gels. These gels are prepared from emeraldine base solutions in N-methyl-2-pyrrolidinone. The films are doped with a variety of doping agents. In terms of conductivity, mechanical properties, and thermal stability, methane sulfonic acid and ethane sulfonic acid dopants yield the best films.

Concerns about limited conductivity and constraints associated with efforts to increase conductivity through increased thickness have been addressed by earlier investigators. However, attempts to increase conductivity through mere increase in thickness of the conductive layer has been associated with poor abrasion resistance of the conductive layer, a tendency to undergo shear-induced delamination, and non-uniformity.

Surface phosphonylation has been achieved through a modified Arbuzov reaction using two approaches by Shalaby et al. in U.S. Pat. Nos. 5,491,198 and 5,558,517. In one approach gas phase phosphonylation is used to create acid-forming functional groups on surfaces in two steps. The first step entails chlorophosphonylation of a hydrocarbon moiety via the reaction of phosphorus trichloride ($PCl_3$) and oxygen, which yields the corresponding phosphonic dichlorides. The phosphonyl dichlorides are subsequently hydrolyzed to phosphonic acid.

In the second approach, a liquid phase method for the surface phosphonylation of preformed thermoplastic polymers has been developed. The polymer is placed in a solution of 10% (v/v) $PCl_3$ in carbon tetrachloride which is bubbled with oxygen. Additionally, a gas phase process for surface phosphonylation has been developed. In this method, the polymer is suspended in a flask containing several drops of $PCl_3$ and oxygen gas. In each method, the polymer is quenched in water after allowing the reaction ample time to reach completion. Characterization of the polymers treated by each method indicates the presence of reactive phosphonate groups on their surface and no change in the bulk material properties.

Although phosphonylation was disclosed in U.S. Pat. Nos. 5,849,415 and 5,591,062, as the means for achieving the surface functionalizing step, U.S. Pat. No. 6,117,554, entitled Modulated Molecularly Bonded Inherently Conductive Polymers on Substrates with Conjugated Multiple Lamellae and Shaped Articles Thereof, teaches that sulfonylation produces sulfonic acid groups which can provide an active substrate for depositing an ICP. However, both phosphonylation and sulfonylation involve harsh, difficult-to-control reactions that frequently compromise the physical integrity of the surface and bulk properties of the device. Meanwhile, surface functionalization, by having covalently bonded carboxylic groups to activate the medical device surface to allow the ICP deposition has not heretofore been taught in the prior art. And specifically, none of the prior art discloses the use of surfaces having dicarboxylic side groups and more specifically, C-succinylated ones as the preferred form of activated surfaces, wherein succinic acid groups are covalently bonded to the polymer chain about the preformed article surface and can direct the formation of ICPs onto the surface.

SUMMARY OF THE INVENTION

Accordingly, this invention deals with a surface electroconductive biostable article which is a biostable polymeric substrate having carboxylic groups covalently bonded onto the surface thereof and a coherent uniform outer layer of an electrically conductive material wherein the electrically conductive material is molecularly bonded to the carboxylic groups, wherein the surface electroconductive biostable article is a surgical device, a lead for activation of biological processes or a heat transfer control device.

Another aspect of this invention deals with a surface electroconductive biostable article which is a biostable polymeric substrate having carboxylic groups covalently bonded onto the surface thereof and a coherent uniform outer layer of an electrically conductive material wherein the electrically conductive material is molecularly bonded to the carboxylic groups, wherein the biostable substrate comprises a thermoplastic polymer selected from polyethylene, polypropylene, nylon 12, biostable segmented polyurethanes or polyesters, and polyether-ether ketone.

A specific aspect of this invention deals with a surface electroconductive biostable article which is a biostable polymeric substrate having carboxylic groups covalently bonded onto the surface thereof and a coherent uniform outer layer of an electrically conductive material wherein the electrically conductive material is molecularly bonded to the carboxylic groups, wherein the carboxylic groups responsible for molecularly binding the electrically conductive material are based on succinic acid side groups bonded, covalently, to the chains of the constituent polymer about the surface.

Another specific aspect of the present invention deals with a surface electroconductive biostable article which is a biostable polymeric substrate having carboxylic groups covalently bonded onto the surface thereof and a coherent uniform outer layer of an electrically conductive material wherein the electrically conductive material is molecularly bonded to the carboxylic groups, wherein the electrically conductive material is an electrically conductive organic polymer formed from at least one monomer selected from pyrrole, a substituted pyrrole, thiophene, a substituted thiophene, and aniline.

Another aspect of this invention is directed to a surface electroconductive biostable article which is a biostable polymeric substrate having carboxylic groups covalently bonded onto the surface thereof and a coherent uniform outer layer of an electrically conductive material wherein the electrically conductive material is molecularly bonded to the carboxylic groups, wherein the surface electroconductive biostable article is in the form of a monofilament, knitted fabric, woven fabric, or non-woven fabric derived from electrospun micro-/nanofibers.

A key aspect of this invention deals with a method for imparting electrical conductivity to biostable polymeric articles comprising the step of pretreating the surface to produce a treated surface having carboxylic groups thereon and depositing an electrically conductive material onto the pretreated surface, wherein the electrically conductive material is an organic polymer.

A specific aspect of this invention deals with a method for imparting electrical conductivity to biostable polymeric articles comprising the step of pretreating the surface to produce a treated surface having carboxylic groups thereon and depositing an electrically conductive material onto the pretreated surface, wherein the method for imparting electrical conductivity involves chemical pretreatment to achieve C-succinylation of the article surface, hydrolysis of the surface-attached anhydride groups to carboxylic groups and deposition of an electrically conductive material onto the pretreated surface.

DETAILED DESCRIPTION OF THE INVENTION

The present invention is directed to the formation of a layer or film of a conductive polymer onto the surface of a biostable polymeric article. Rather than merely enveloping or encasing the article, the present conductive polymer layer is molecularly bound to the outer surface of the article. Such bonding provides for an outermost conductive layer which is strongly adhered to the article and allows the article to have any of a variety of forms and sizes. Within the scope of the present invention are, for example, films, fibers, textile materials, and molded articles formed from polymers such as polyolefins, polyamides, polyesters, polyurethanes, polyketones, polyether-ether ketones, polystyrene, and members of the vinyl and acrylic families of polymers and copolymers thereof, as well as articles formed from polymeric composites.

Articles produced in accordance with the present invention are suitable and appropriate for a variety of end use applications where conductivity may be desired including, for example, antistatic garments, antistatic floor coverings, components in computers, and generally, as replacements for metallic conductors, or semiconductors, including such specific applications as, for example, batteries, photovoltaics, electrostatic dissipation and electromagnetic shielding, for example, as antistatic wrappings of electronic equipment or electromagnetic interference shields for computers and other sensitive instruments, including aerospace applications and biomedical devices. A specific use of this technology entails the use of ICP-coated polymeric insulators, such as pre-activated and polypyrrole-coated, non-woven polyethylene or polypropylene fabrics for civilian dwellings and military buildings or installations to shield and protect electronic equipment against outside interference. A preferred end use for the present invention includes medical applications such as surgical and diagnostic devices and instruments, or components thereof, conductive wires or leads for activation of biological processes, and antistatic clothing for use by operation room personnel. Further applications include coatings for controlled heat transfer and medical/biomedical implants.

Broadly, the method of the present invention is directed to a pretreatment step which renders the outer surface of the polymeric article reactive by providing carboxylic anhydride groups that are hydrolyzed to the corresponding dicarboxylic acid groups followed by a polymerization step whereby a precursor monomer of a conductive polymer is polymerized directly onto the reactive surface. In addition to providing for molecular bonding of the conductive polymer to the article's surface, the functional groups act, at least in part, as both a doping agent and an oxidizing agent to aid in polymerization.

A preferred means for completing the surface activation prior to depositing the electro-conductive material is similar to that disclosed by this inventor in copending U.S. Publication No. 2004-0132923 A1, incorporated herein by reference, for bulk C-succinylation. This entails the free-radically initiated addition of maleic anhydride, as a solute in dioxane, in the presence of benzoyl peroxide. Meanwhile, the preferred conductive polymers to be formed in accordance with the present invention include polyaniline, polypyrrole and polythiophene although any polymer which forms polaronic or bipolaronic moieties may be employed. The polarons and bipolarons are, generally, the charge carrying species which are generated by the oxidation of the conjugated polymer backbone. And the most preferred conductive polymer to be formed in accordance with the present invention is polypyrrole.

Doping agents are generally strong acids such as p-toluenesulfonic acid, naphthalene disulfonic acid, methane sulfonic acid, chloromethyl sulfonic acid, fluoromethyl sulfonic acid, oxalic acid, sulfosalicylic acid and trifluoroacetic acid. However, the acid moieties of the functional groups formed on the surface during pretreatment may also serve as dopants, either in combination with an externally supplied doping agent or alone. Similarly, oxidizing agents, such as ammonium peroxydisulfate, ferric chloride, salts of permanganates, peracetates, chromates and dichromates, may be employed, although the multivalent central atom of the functional groups on the article's chemically interactive surface may also serve as an oxidizing agent, either in combination with an externally supplied oxidizing agent, or alone.

Electrically conductive articles formed in accordance with the present invention include an outer layer of an inherently conductive polymer which is bonded to the preshaped substrate. As compared to electrically conductive textile fibers of the prior art which had, essentially, an outer shell of a conductive polymer enveloping or encasing each underlying fiber substrate, the present outer ICP layer is believed to be ionically bonded to the underlying substrate. Such bonding scheme is verified by the retention of electrical conductivity following a period of agitation, such as sonication.

Organic inherently conductive polymers, such as those based on polyaniline, polypyrrole and polythiophene, are formed in situ onto polymeric surfaces that are chemically activated to bond ionically the conductive polymers to the substrates. The polymeric substrate is preferably a preshaped or preformed thermoplastic film, fabric, tube, or a medical device for tissue repair regeneration and/or replacement, although other forms of thermoplastic and thermoset polymers can be used as the substrates for pretreatment using, most preferably, C-succinylation-based processes followed by exposure to an oxidatively polymerizable compound capable of forming an electrically conductive polymer. The resultant conductive surface imparts unique properties to the substrates and allows their use in antistatic clothing, surface conducting films for electronic components and the like, and electromagnetic interference shielding for civilian and military installations as well as implantable medical devices.

The following techniques were used to analyze and characterize samples produced in accordance with the present.

Fourier Transform Infrared Spectroscopy (FTIR) was used to quantify changes in the composition and bonding at film surfaces. In the internal reflection mode FTIR permits recording of the diagnostic infrared finger print of thin films formed onto a surface without interference from the bulk material. Basically, FTIR identifies absorbance peaks at characteristic wave numbers associated with known chemical bonds. For present purposes, FTIR was employed to identify characteristic peaks associated with bonds formed by the incorporation of carboxylic acid anhydride and the corresponding dicarboxylic acid side groups in the polymer backbone of C-succinylated and then hydrolyzed films, respectively, prior to polymerization of any conductive polymer thereon. Then, the functionalized film spectra were compared with those of conductive polymer-bonded films in an effort to elucidate bonding schemes at the film surface.

The present FTIR spectra were obtained using a Perkin-Elmer infrared spectrometer, Paragon 1000 PC.

Surface resistivities were measured to evaluate relative surface conductance using a four point probe technique on an Alessi C4S-44 probe. A Bioanalytical System BAS 100b electrochemical analyzer was used as the current source. A fluke 8040A multimeter measured the resistance between the middle two probe tips. The probe tips were set in a linear configuration, and a constant current of 0.3 μA was applied between tips 1 and 4. The resistance was measured between tips 2 and 3. Several measurements were taken for each sample, and their average was recorded.

Additional illustrations of the present invention are provided in the following examples:

EXAMPLE 1

Preparation and C-Succinylation of Polypropylene using Free-radically Induced Maleation Polypropylene beads were compression molded at about 210° C. to yield thin films for surface modification. Appropriate sizes were then cut for the C-succinylation. Films were then sonicated in distilled water for 60 minutes and then dried at 40° C. under reduced pressure. A solution of 0.987 M maleic anhydride and 0.084 M benzoyl peroxide was prepared in dioxane. Then each film was placed in this solution and reacted at 80° C. for three hours. Upon removal, films were rinsed with cold distilled water and sonicated twice for 30 minutes, removing the water after each sonication. Films were removed and dried in a vacuum oven at 40° C. for three hours. The film was characterized by FTIR, which revealed the presence of essentially intact anhydride functionalities.

EXAMPLE 2

In Situ Formation of Ionically Bound Polypyrrole on C-Succinylated Polypropylene and Measurement of Surface Conductivity The C-succinylated films from Example 1 were placed in distilled water at 80° C. for two days. This was done to hydrolyze the succinic anhydride group to the corresponding dicarboxylic acid. Then, the film was removed and dried at 37° C. for three hours. Analysis of the dried films by FTIR indicated that essentially all the anhydride groups were hydrolyzed to the corresponding dicarboxylic acid. A solution of a 0.005 M pyrrole, 0.001 M naphthalene disulfonic acid tetrahydrate, 0.001 M sulfosalicylic acid, and 0.019 M ferric chloride was prepared and used for treating the surface-functionalized film and allow pyrrole to polymerize on the surface. Thus, the film was added to the mixture and stirred for 16 hours at room temperature. Once removed, the film was rinsed with distilled water and sonicated for 30 minutes. The film was then dried at 50° C. under reduced pressure for two hours. Then the linear resistance of the films was measured and revealed an average value of 0.1 KΩ/mm.

Preferred embodiments of the invention have been described using specific terms and devices. The words and terms used are for illustrative purposes only. The words and terms are words and terms of description, rather than of limitation. It is to be understood that changes and variations may be made by those of ordinary skill art without departing from the spirit or scope of the invention, which is set forth in the following claims. In addition it should be understood that aspects of the various embodiments may be interchanged in whole or in part. Therefore, the spirit and scope of the appended claims should not be limited to descriptions and examples herein.

What is claimed is:

1. A surface electroconductive biostable article comprising a biostable polymeric substrate having succinic acid-based carboxylic groups covalently bonded onto the surface thereof and a coherent uniform outer layer of an electrically conductive material, wherein the electrically conductive material is molecularly bonded to the carboxylic groups.

2. The article set forth in claim 1 wherein the surface electroconductive biostable article is a surgical device.

3. The article set forth in claim 1 wherein the surface electroconductive biostable article is a lead for activation of a biological process.

4. The article set forth in claim 1 wherein the surface electroconductive biostable article is a heat transfer control device.

5. The article set forth in claim 1 wherein the polymeric substrate comprises a thermoplastic polymer selected from the group consisting of polyethylene, polypropylene, and polyether-ether ketone.

6. The article set forth in claim 1 wherein the electrically conductive material is an electrically conductive organic polymer formed from at least one monomer selected from the group consisting of pyrrole, a substituted pyrrole, thiophene, a substituted thiophene, azid aniline.

7. The article set forth in claim 1 wherein the surface electroconductive biostable article is in the form of a monofilament.

8. The article set forth in claim 1 wherein the surface electroconductive biostable article is in the form of knitted fabric.

9. The article set forth in claim 1 wherein the surface electroconductive biostable article is in the form of woven fabric.

10. The article set forth in claim 1 wherein the surface electroconductive biostable article is in the form of non-woven fabric derived from electrospun micro/nanofibers.

* * * * *